United States Patent
Naylor

[15] 3,664,329
[45] May 23, 1972

[54] NERVE LOCATOR/STIMULATOR
[72] Inventor: Richard Norman Naylor, Clearwater, Fla.
[73] Assignee: Concept, Inc., St. Petersburg, Fla.
[22] Filed: Mar. 9, 1970
[21] Appl. No.: 17,457

[52] U.S. Cl. .................................... 128/2.1 R, 128/405
[51] Int. Cl. ............................................. A61f 5/00
[58] Field of Search............... 128/2.06 R, 2.1 R, 419, 303.1, 128/303.13, 405, 406; 324/51, 53

[56] References Cited

UNITED STATES PATENTS

| | | | |
|---|---|---|---|
| 2,516,882 | 8/1950 | Kalom | 128/2.1 R |
| 2,704,064 | 3/1955 | Fizzell et al. | 128/2.1 R |
| 3,207,151 | 9/1965 | Takagi | 128/2.1 R |
| 3,128,759 | 4/1964 | Bellis | 128/2.1 R |
| 3,027,891 | 4/1962 | Fields et al. | 128/2.06 R |
| 1,158,473 | 11/1915 | Floyd | 128/405 |

Primary Examiner—William E. Kamm
Attorney—Arthur H. Van Horn

[57] ABSTRACT

A self contained, portable, disposable, self testing and self powered instrument for use in medical procedures to stimulate nerves and to determine if the tissue in question is a muscle controlling nerve, by delivering a maximum of 2 milliamperes of current through human tissue in the general area to be probed by an insertion of a probe electrode (negative) in subcutaneous tissue after an incision has been made and implanting a needle (positive electrode) anywhere in subcutaneous tissue as a ground.

2 Claims, 4 Drawing Figures

INVENTOR
RICHARD NORMAN NAYLOR
ATTORNEY

NERVE LOCATOR/STIMULATOR

NATURE AND OBJECTS OF THE INVENTION

This invention resides in a sterile, disposable, portable and self powered, self testing instrument for locating and stimulating motor nerves in a wide range of surgical procedures where identification of motor nerves is necessary; e.g., long thoracic and intercostal nerves in chest surgery, hand and joint surgery, traumatic surgery and head and neck surgery. In the latter use, the instrument may be used to identify facial nerves or to locate the main trunk of the facial nerve, or to identify facial nerve in its Fallopian canal in radical mastoid surgery. The instrument is convenient, economical and easy to use, and designed for self testing before use to insure its operability.

DRAWINGS

DESCRIPTION

In carrying out the invention, the instrument includes a casing or housing, a self contained source of electrical energy, a blunt probe needle mounted in one end of the housing, a test light bulb and bulb retainer carried in the opposite end of the housing, a flexible insulated electric conductor leading from the said opposite end of the housing and having connection with a current limiting resistor and the grounding needle.

Figures 3, 4:
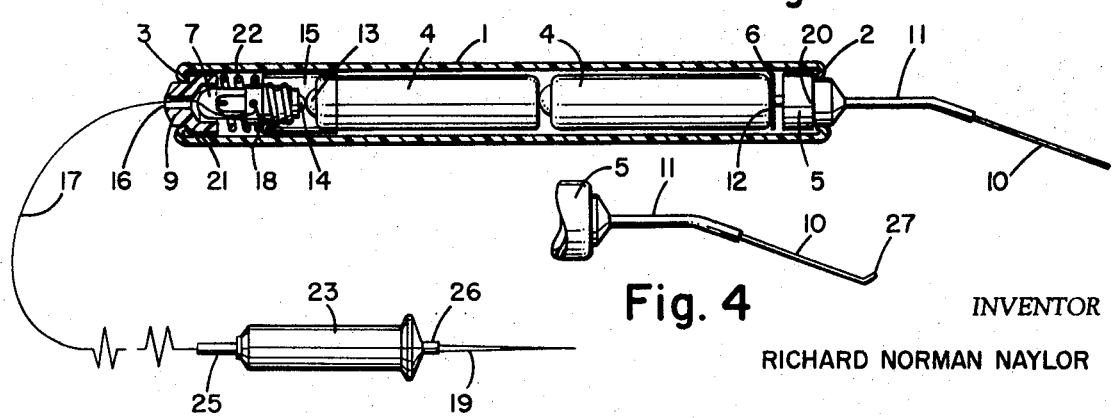
FIG. 3 is a longitudinal central section through the housing for the energizers and shows the probe needle mount at the forward end of the housing, the test bulb and grounding needle and current limiting means in elevation.
FIG. 4 shows a modified form of probe needle.

More specifically, as illustrated in FIG. 3, the casing or housing 1 comprises a rigid tube, preferably formed of tough polyvinyl or similar substance, having inturned annular retaining flanges 2 and 3 to provide a container for one or more batteries or energizers 4 arranged in series, a probe needle retainer 5, the metallic contact disc 6, a test light bulb 7, spacing sleeve 15, and the bulb retainer 9, respectively. The blunt stainless steel probe needle 10 is rigidly mounted in the insulating retainer 5 and is firmly locked at its rear end portion in a metallic tube 11 by press fitting or crimping the two together. The inner end of the tube 11 has electrical contact with the disc 6, which in turn has electrical contact with the negative terminal 12 of the forwardmost of the series connected batteries 4.

The positive terminal 13 of the rear battery is in contact with a terminal 14 of the light bulb base projecting within the spacer sleeve 15, formed of rigid insulating material. The bulb retainer 9 has an axial opening 16 or duct through which the insulated conductor 17 is threaded, one end of which is in electrical contact with the metal casing of the bulb base as in 18, while its other end is connected with the ground electrode or needle 19. Inturned flanges 2 and 3 of the casing engage, respectively, the shoulders 20 and 21 of the retainers 5 and 9 under the compression forces exerted by the coiled spring 22 on the retainer 9 and forwardly through the bulb base electrode and the batteries 4 and disc 6 and against the base of the probe assembly, to thereby maintain these elements in line contact as clearly illustrated in FIG. 3.

Needle 19 is rigidly carried in a Delrin hand gripping tube 23 having a longitudinal bore in which a suitable current limiting resistor element 24 is housed, and is in series electrical contact with the conductor 17 at one end and with the needle electrode 19 at its other end. Metallic sleeves 25 and 26 project from the ends of the tube 23 and at their inner ends are in series electrical contact with the resistor element 24.

Figure 1:
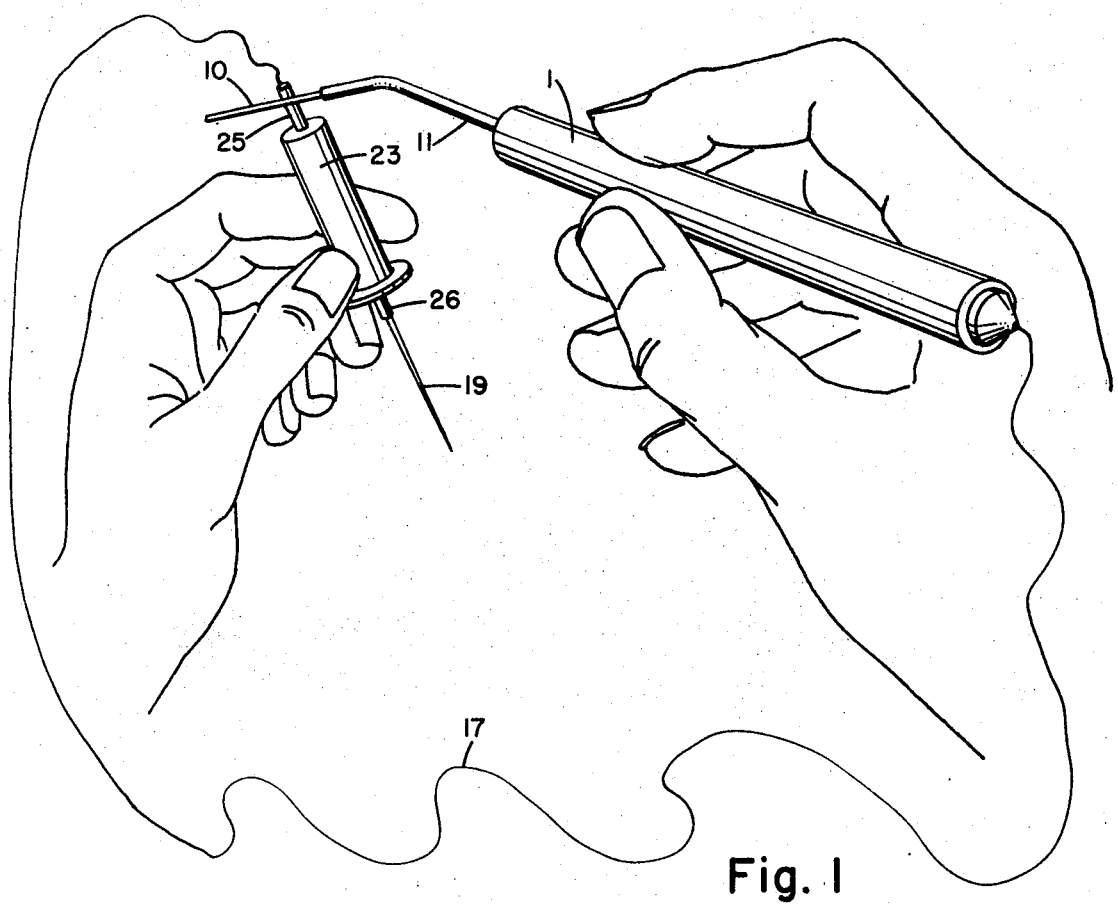
FIG. 1 illustrates the instrument and the manner of testing.
Figure 2:
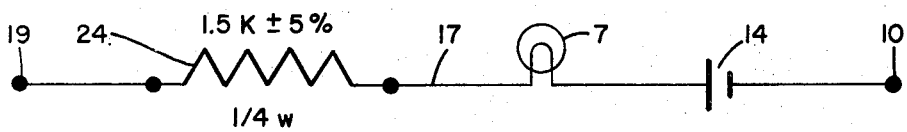
FIG. 2 is a wiring diagram of the series circuit employed in using the instrument.

Thus, it will be seen that in testing the instrument for operativeness, as illustrated in FIG. 1, where the probe needle is contacted with the sleeve 25, the resistance element is bypassed or shunted out and the full current output of the batteries 4 is utilized to energize and light the bulb 7 as a signal that the instrument is in working order.

In normal use, as explained above, and with the ground needle 19 implanted in living subcutaneous tissue, the probe needle 10 is inserted in an incision to locate and stimulate a nerve controlling a motor muscle. Where the probe needle (negative electrode) is touched to exposed nerve tissue, contraction of normally innervated muscle will occur.

In such use, the needle 10 becomes an electrode of negative polarity while the ground needle is an electrode of positive polarity. Having previously determined by test that the instrument is in working order, the current control resistor of proper value to deliver a maximum of 2 milliamperes through the tissue being probed will be activated. It will be noted that the test bulb will not light because of reduced current output of the resistor.

In FIG. 4 is shown a modified form of probe needle which is provided with a blunt or flat tip as indicated at 27 for exploring larger subcutaneous areas or for limiting the depth of probe on insertion in an incision.

It will be seen that by virtue of the invention, the instrument can be presterilized as a whole, for one time use and may then be disposed of. The structure is simple, is economical to manufacture even as a disposable device, is easy to use and is self testing to insure sufficient current flowing through the probe needle to stimulate normal nerve tissue.

I claim:

1. A sterile, portable and disposable, self testing nerve locator/stimulator comprising a tubular casing, a source of direct current within the casing, a nerve probe needle mounted in one end of the casing in negative potential contact with said source, a flexible insulated conductor in positive potential contact at one end with said source, signal means in series with said conductor and said source, a grounding needle for implantation in living subcutaneous tissue, current limiting means serially connecting said grounding needle and the opposite end of said positive potential conductor, whereby to deliver a current maximum of approximately 2 milliamperes to subcutaneous tissue, in which the grounding needle is implanted, to said probe needle in contact with another area of living subcutaneous tissue, said positive conductor having an uninsulated portion between said current limiting means and the said one end of said positive conductor adapted to be contacted by said probe needle to shunt out said current limiting means and thereby energize the signal means.

2. In a sterile, disposable, single use nerve locator/stimulator, a tubular casing, a source of direct current within the casing, a subcutaneous probe needle, a grounding needle independent of said probe needle for implantation in subcutaneous tissue, a flexible insulated conductor electrically connecting the grounding needle with the positive potential of said current source, said probe and grounding needles electrically coupled in series with said source for imparting negative polarity to the probe and positive polarity to the grounding needle when said needles are in contact with subcutaneous tissue areas of a living being, current limiting means serially connecting said grounding needle and the opposite end of said positive potential conductor, visual signal means in series with said conductor and said source, said positive potential conductor having an uninsulated portion between said current limiting means and the said one end of said positive conductor adapted to be contacted by said probe needle to shunt out said current limiting means and thereby energize the visual signal means.

* * * * *